Patented Sept. 10, 1940

2,214,125

UNITED STATES PATENT OFFICE 2,214,125

MANUFACTURE OF CELLULOSE

Henry Dreyfus, London, England

No Drawing. Application June 17, 1937, Serial No. 148,664. In Great Britain July 3, 1936

9 Claims. (Cl. 92—9)

This invention relates to the manufacture of cellulose from lignin-containing cellulosic materials such as wood, straw, grass and the like, and wood pulps.

According to the invention the lignin-containing cellulosic material is subjected to treatment with nitrous acid in the liquid phase, followed by a treatment with alkali.

Advantageously the nitrous acid may be employed in association with an organic acid, and preferably with a lower aliphatic acid, e.g., formic acid, and especially acetic acid. The organic acid may be employed in concentrated form or in the form of an aqueous or other solution. For example, aqueous acetic acid of concentration of the order of 15%, 25%, 50% or 75% may be employed.

The nitrous acid is preferably formed in situ by reaction between a suitable nitrite and the desired organic acid or, if no organic acid is to be used, a suitable mineral acid, which may be present in amount sufficient or more than sufficient to decompose the nitrite. It is, however, best to have present throughout the nitrous acid treatment excess of an organic acid. Moreover, if desired, mineral acid may be present as well as the organic acid, but in such cases it is preferable that the amount of mineral acid does not greatly exceed the equivalent of the nitrite present.

Any suitable nitrite may be employed, sodium and potassium nitrites and other alkali metal nitrites being particularly useful. Advantageously the nitrite may be employed in aqueous solution. The amount of nitrous acid employed may, for example, be ¼%, ½%, 1%, 2% or 5% of the amount of organic acid or solution thereof. For example, a 25 or 50% solution of acetic acid may be used in association with sufficient sodium nitrite to form between ½ and 2% of nitrous acid based on the weight of the acetic acid solution, although the proportion of nitrous acid employed may be outside this range.

The acid liquor is preferably employed in amount at least 10 times the weight of the wood or other lignin-containing cellulosic material. Preferably the weight of the acid liquor is of the order of 15, 20, 25 or even more times the weight of the cellulosic material.

The treatment with the acid may be carried out in the cold or at elevated temperatures, for example 50° C. or 100° C. The treatment may be carried out under atmospheric pressure or higher pressures may be employed, such higher pressures being produced by means of inert gases such as nitrogen or in any other suitable way.

Although the whole of the organic acid and the whole of the nitrous acid or sodium nitrite or other substance employed to give rise to the nitrous acid may be brought into contact with the cellulosic material at the beginning of the treatment, it is preferable to start with the organic acid, and to add a nitrite slowly thereto, preferably in aqueous solution; on the other hand the organic acid or an aqueous solution thereof may be gradually added to a dilute aqueous nitrite solution. Either method may usefully be adopted when a mineral acid is used to decompose the nitrite.

The time during which the lignin-containing cellulosic material is subjected to the action of the acid liquor will depend on a number of factors, such as the nature of the material being treated, the concentration of the acid and the temperature and pressure employed. Usually a period of about 6, 9 or 12 hours is sufficient, but longer or shorter periods may often be employed.

After the treatment with the acid liquor the cellulosic material may be freed therefrom as far as possible by pressing, centrifuging or in any other way and may, if desired, be washed. Thereafter it is subjected to a treatment with alkali. For example, it may be treated with cold, moderately strong alkali, e. g., a caustic soda solution of 10, 12, 15 or 20% and/or it may be treated with a warm or hot or boiling solution of an alkali of lower concentration, and especially of concentration of about 5% or less, for instance between 1½ and 3½%. The treatment with such dilute alkali may be relatively vigorous; for example it may be carried out at the boiling point of the alkali solution at atmospheric pressure or may be carried out at higher pressure, either at the boiling temperature or below the boiling temperature, for example at temperatures from 100°–130° C. Such dilute alkali may be used under a pressure in excess of the vapour pressure of the solution at the temperature obtaining. Such excess pressure may for example be produced by compressed nitrogen or other gas having no deleterious effect on the treatment. Thus pressures of 6–10 atmospheres in excess of the vapour pressure of the alkali solution may be employed at temperatures of 100°–130° C.

The cellulosic material resulting from the treatment with the acid liquor may with advantage be subjected to a two-fold treatment with alkali, preferably first with dilute alkali at elevated or moderately elevated temperatures and under atmospheric pressure or superatmospheric pressure, and then with cold, more concentrated alkali, for example caustic alkali of concentration between 10 and 20%.

In one form of the invention the treatment with the acid liquor may be preceded by a treatment with alkali. Such a preliminary alkali treatment may, for example, be carried out by means of dilute alkali at an elevated temperature, for instance a caustic alkali of concentration of the order of 1–5% or more at a temperature in the neighbourhood of or exceeding 100° C. Advantageously this alkali treatment may be continued until a substantial proportion of the lignin contained in the materials has been removed. Whether or not a preliminary alkali treatment of this kind is employed the materials may first be subjected to a treatment which will remove resins, gums and like materials, for example a treatment with dilute alkali or with water under atmospheric or higher pressure. Moreover, if desired, part of the lignin may be removed from the materials by an acid treatment, for example by means of a sulphite liquor, before the treatment with the organic acid and nitrous acid. Further, the process of the invention may be applied to the purification of pulps, e. g., sulphite, soda, or sulphate pulp, or pulps produced by means of chlorine or by means of organic solvents, which still contain residual lignin and/or pentosans.

Any one or more of the various treatments may be carried out in stages. For example the treatment with the acid liquor may be repeated before a treatment with alkali and/or one or both of the alkali treatments specified may be repeated one or more times. Moreover between two acid treatments the material may if desired be washed or treated as for example with water or an alkaline solution at ordinary or elevated temperatures.

The treatments described above are particularly suitable for obtaining cellulose from woods of various kinds. The more resistant woods such as spruce wood may if desired be subjected to somewhat more vigorous conditions than those specified above, but it is advisable in most cases not to depart very far from the conditions specified so as to preserve the yield of cellulose and to prevent undue loss by degradation. When part of the lignin is removed by a preliminary alkali treatment or by any other preliminary treatment the material remaining may be subjected to less vigorous conditions during the acid treatment and/or the subsequent alkali treatment or treatments. For example, the acid or alkali concentrations may be reduced, lower temperatures may be employed and/or the treatment may be continued for a shorter time.

The lignin-containing material to be treated is preferably in a relatively finely divided form. For example, wood may be employed in the form of chips or even of sawdust or a mechanical wood pulp.

The cellulose prepared by the present process may be utilised for any desired purpose, for example for the manufacture of cellulose derivatives or for the manufacture of paper or other products comprising fibrous cellulose. It may be subjected to any desired treatments such as, for example, a chlorine or hypochlorite bleach or other bleaching treatment.

For the manufacture of organic esters of cellulose with the aid of organic acid anhydrides the cellulose, after the alkali treatment which follows the acid treatment, is preferably subjected to a further treatment with an acid and particularly with a lower fatty acid, e. g., formic acid or acetic acid. Such acids may be applied in small or large quantities and in liquid or vapour form. Similarly treatments with mineral acids, for example hydrochloric acid, sulphuric acid or nitric acid, may be applied, preferably in conjunction with acetic acid or other lower fatty acid. Such treatments are preferably carried out under conditions of temperature, concentration and quantity of mineral acid which do not lead to substantial degradation of the cellulose. A treatment with a lower fatty acid, for example acetic acid, may be applied in such a way as to introduce into the cellulose the catalyst required for the subsequent acetylation or other esterification. If desired any mineral acid used during the pretreatment may be neutralised or substantially neutralised before applying the esterifying agent. For further details as to the pretreatment reference is made to my French specification No. 565,654 and my U. S. Patents Nos. 1,831,101 and 1,911,069.

For the manufacture of good quality cellulose ethers and for the manufacture of viscose and other cellulose derivatives in which alkali is present during the conversion into the cellulose derivative, pretreatments with mineral and/or organic acids are in general unnecessary and the cellulose, if desired after bleaching, may be subjected directly to the treatment for conversion into the desired cellulose derivative. Similarly in making nitrocellulose the nitrating acid may be applied directly to the cellulose, bleached or unbleached, prepared in accordance with the present invention.

Cellulose esters and ethers made from cellulose produced as above described may be employed in the manufacture of articles such as filaments and yarns of artificial silk and films, foils, moulded articles, etc., as also in compositions such as lacquer and other coating compositions and moulding powders.

The following examples illustrate, without in any way limiting, the invention.

*Example 1*

Spruce wood chips are heated to 45° C. with 20 times their weight of acid liquor, consisting of 50% aqueous acetic acid containing 3% by weight of sodium nitrite. After about 5 hours the liquor is run off, and the material first washed with hot water or very dilute alkali, and then boiled at 120° C. with 2% sodium hydroxide. The cellulose so produced may be further purified by treatment with 8–10% sodium hydroxide in the cold, and if desired a final bleach, for example with sodium or calcium hypochlorite, may be applied.

The process may be modified by first heating the chips with 3% sodium hydroxide to 140° C. for two to four hours, and washing them free from alkali before applying the nitrous acid treatment, which can be carried out for a shorter time than when no preliminary alkali treatment is applied.

*Example 2*

Spruce chips are heated with 25 times their weight of 30% acetic acid, and as soon as a temperature of 60° C. is attained there is added to the acid liquor, over a period of 4 hours, a saturated aqueous solution containing 6% of potassium nitrite or 7% of sodium nitrite, calculated on the weight of the aqueous acetic acid. When all the nitrite has been added the temperature is maintained at 60° C. for another hour, after which the liquor is run off, and the material washed substantially free from acid with hot water, and then treated with alkali as described in Example 1. If the acid treatment is preceded by an alkali treatment adapted to remove lignin, its duration may be considerably reduced.

*Example 3*

Poplar is subjected to the treatment described in Example 1 or 2, except that the acid solution contains in each case hydrochloric acid in amount sufficient to liberate all the nitrous acid from the nitrite.

*Example 4*

Spruce chips are heated to 65° C. with a 4% solution of sodium nitrite, and dilute hydrochloric acid, in amount equivalent to the amount of sodium nitrite, is added slowly over a period of 4 hours. The liquor is stirred continuously during the addition of the hydrochloric acid. When all the acid has been added, the liquor is kept at 65° C. for another hour, and is then run off. The chips are washed and subjected to the treatment with alkali described in Example 1.

Having described my invention, what I desire to secure by Letters Patent is:

1. Process for the manufacture of cellulose from lignin-containing cellulosic materials, which comprises removing non-cellulosic constituents from the materials by treating the materials first simultaneously with nitrous acid in the liquid phase and with a 15 to 75% aqueous solution of a lower aliphatic acid, free aliphatic acid being present up to the end of the nitrous acid treatment, and then with an alkali solution.

2. Process for the manufacture of cellulose from lignin-containing cellulosic materials, which comprises removing non-cellulosic constituents from the materials by treating the materials first with nitrous acid in a 15 to 75% aqueous solution of acetic acid, free acetic acid being present up to the end of the nitrous acid treatment, and then with an alkali solution.

3. Process for the manufacture of cellulose from lignin-containing cellulosic materials, which comprises removing non-cellulosic constituents from the materials by treating the materials first simultaneously with nitrous acid in the liquid phase and a 15 to 75% aqueous solution of a lower aliphatic acid, the nitrous acid being produced in the presence of the materials by reaction between a nitrite and the lower aliphatic acid, and the amount of aliphatic acid used being such that free aliphatic acid remains when all the nitrite has been decomposed, and then with an alkali solution.

4. Process for the manufacture of cellulose from lignin-containing cellulosic materials, which comprises removing non-cellulosic constituents from the materials by treating the materials first simultaneously with nitrous acid in the liquid phase and a 15 to 75% aqueous solution of acetic acid, the nitrous acid being produced in the presence of the materials by reaction between a nitrite and the acetic acid, and the amount of acetic acid used being such that free acetic acid remains when all the nitrite has been decomposed, and then with an alkali solution.

5. Process for the manufacture of cellulose from lignin-containing cellulosic materials, which comprises removing non-cellulosic constituents from the materials by treating the materials first simultaneously with nitrous acid in the liquid phase and a 15 to 75% aqueous solution of a lower aliphatic acid, the nitrous acid being produced in the presence of the materials and of the lower aliphatic acid by reaction between a nitrite and approximately the equivalent amount of a mineral acid, and then with an alkali solution.

6. Process for the manufacture of cellulose from lignin-containing cellulosic materials, which comprises removing non-cellulosic constituents from the materials by treating the materials first simultaneously with nitrous acid in the liquid phase and a 15 to 75% aqueous solution of acetic acid, the nitrous acid being produced in the presence of the materials and of the acetic acid by reaction between a nitrite and approximately the equivalent amount of a mineral acid, and then with an alkali solution.

7. Process for the manufacture of cellulose from lignin-containing cellulosic materials, which comprises removing non-cellulosic constituents from the materials by immersing the materials in a 15 to 75% aqueous solution of a lower aliphatic acid at a temperature of at most about 100° C., gradually adding to the solution an aqueous solution of a nitrite in amount less than is equivalent to the aliphatic acid, allowing the nitrous acid so produced and the aliphatic acid to act on the materials, freeing the materials from acid, and treating them with an alkali solution.

8. Process for the manufacture of cellulose from lignin-containing cellulosic materials, which comprises immersing the materials in a 15 to 75% aqueous solution of acetic acid at a temperature of at most about 100° C., gradually adding to the solution an aqueous solution of a nitrite in amount less than is equivalent to the acetic acid, allowing the nitrous acid so produced and the acetic acid to act on the materials, freeing the materials from acid, and treating them with an alkali solution.

9. Process for the manufacture of cellulose from lignin-containing cellulosic materials, which comprises immersing the materials in a 15 to 75% aqueous solution of acetic acid at a temperature of at most about 100° C., gradually over a period of hours adding to the solution an aqueous solution of an alkali metal nitrite in amount such that the weight of nitrous acid set free is between ¼ and 5% of the weight of the acetic acid solution, freeing the materials from acid, and treating them at an elevated temperature with a caustic alkali solution of concentration at most 5%.

HENRY DREYFUS.